United States Patent
Kim et al.

(10) Patent No.: US 11,796,206 B1
(45) Date of Patent: Oct. 24, 2023

(54) CONTROL METHOD FOR AIR CONDITIONING OF INTERIOR SPACE BASED ON MODE SELECTION

(71) Applicant: Kevinlab Co., Ansan-si (KR)

(72) Inventors: Kyung Hak Kim, Suwon-si (KR); Sung Hwan Choi, Seoul (KR)

(73) Assignee: Kevinlab Co., Ansan-si (KR)

( * ) Notice: Subject to any disclaimer, the term of this patent is extended or adjusted under 35 U.S.C. 154(b) by 0 days.

(21) Appl. No.: 18/106,843

(22) Filed: Feb. 7, 2023

(30) Foreign Application Priority Data

Dec. 7, 2021 (KR) .......................... 10-2021-0173771

(51) Int. Cl.
| | | |
|---|---|---|
| *F24F 11/65* | (2018.01) | |
| *F24F 11/46* | (2018.01) | |
| *G05B 19/042* | (2006.01) | |
| *F24F 110/10* | (2018.01) | |

(52) U.S. Cl.
CPC .............. *F24F 11/65* (2018.01); *F24F 11/46* (2018.01); *G05B 19/042* (2013.01); *F24F 2110/10* (2018.01); *G05B 2219/2614* (2013.01)

(58) Field of Classification Search
CPC ...................................................... F24F 11/65
See application file for complete search history.

(56) References Cited

U.S. PATENT DOCUMENTS

| | | | |
|---|---|---|---|
| 10,852,018 B1* | 12/2020 | Floro ........................ | F24F 11/65 |
| 2017/0219232 A1* | 8/2017 | Lemaire .................... | F24F 11/54 |
| 2020/0182505 A1* | 6/2020 | Shinozaki ................ | F24F 11/83 |
| 2021/0231340 A1* | 7/2021 | Nystrom ............. | G06F 16/2358 |
| 2021/0302052 A1* | 9/2021 | Trinh .................... | F24F 11/0008 |

FOREIGN PATENT DOCUMENTS

| | | |
|---|---|---|
| KR | 10-2014-0099345 A | 8/2014 |
| KR | 10-2015-0064346 A | 6/2015 |
| KR | 10-1678432 B1 | 11/2016 |
| KR | 10-1824324 B1 | 3/2018 |
| KR | 10-2095896 B1 | 4/2020 |
| KR | 10-2240768 B1 | 4/2021 |

OTHER PUBLICATIONS

Office Action issued in KR 10-2021-0173771; mailed by the Korean Intellectual Property Office dated Sep. 2, 2022.
"Decision to Grant" Office Action issued in KR 10-2021-0173771; mailed by the Korean Intellectual Property Office dated Jul. 25, 2022.

\* cited by examiner

*Primary Examiner* — Nathan L Laughlin
(74) *Attorney, Agent, or Firm* — Studebaker & Brackett PC

(57) ABSTRACT

A control method for air conditioning is proposed. The control method, which is provided to operate an air conditioning apparatus air conditioning an interior space, includes selecting either a comfort priority mode and an energy saving mode as an operational mode, inputting an input air conditioning temperature for air conditioning the interior space, setting a basic air conditioning temperature or a revised air conditioning temperature, by comparing the input air conditioning temperature and the basic air conditioning temperature read out from data in a database, as an air conditioning operational temperature, and operating the air conditioning apparatus so that the interior space is air conditioned at the air conditioning operational temperature.

7 Claims, 2 Drawing Sheets

CONTROL METHOD FOR AIR CONDITIONING OF INTERIOR SPACE BASED ON MODE SELECTION

STATEMENT REGARDING NATIONALLY SPONSORED RESEARCH OR DEVELOPMENT

This invention was made with government support by the Korea Institute of Energy Technology Evaluation and Planning (KETEP) on the basis of financial resource from the Ministry of Trade, Industry & Energy, Republic of Korea in 2021, under Project No. 20212020900380. The Government has certain rights to the invention.

CROSS REFERENCE TO RELATED APPLICATION

The present application claims priority to Korean Patent Application No. 10-2021-0173771, filed Dec. 7, 2021, the entire contents of which is incorporated herein for all purposes by this reference.

BACKGROUND OF THE INVENTION

Field of the Invention

The present disclosure relates generally to a control method for air conditioning.

Description of the Related Art

Air conditioning is to control temperature, humidity, etc. of an interior space so as to ensure the comfort of an occupant in the interior space and, mainly, air conditioning means cooling or heating for controlling the temperature of the interior space. The air conditioning is generally performed with conditions desired by the occupant of the interior space, wherein the occupant simply sets a target air conditioning temperature or strength and weakness of a wind volume.

Therefore, conventionally, regardless of whether set air conditioning is actually suitable to ensure the comfort of the occupant, when the occupant sets an air conditioning temperature and an air volume, an excessive cost may be required for air conditioning or the time required to ensure the comfort of the occupant may be increased. Furthermore, in order to perform more efficient air conditioning of the interior space, various variables affecting temperature change of the interior space should be considered, but conventionally, a detailed control method for air conditioning reflecting the various variables has not been disclosed.

Documents of Related Art (Patent Document 1) Korean Patent No. 1824324 (Title: Air conditioner and method for controlling thereof)
(Patent Document 2) Korean Patent No. 2095896 (Title: Apparatus for controlling air conditioner based on reinforcement learning)
(Patent Document 3) Korean Patent No. 2240768 (Title: Integrated control system of indoor environment)

SUMMARY OF THE INVENTION

The present invention has been made keeping in mind the above problems occurring in the related art, and the present disclosure is intended to provide a control method for air conditioning, and the method is configured to ensure economically the comfort of an occupant.

According to one aspect of the present invention, there is provided a control method for air conditioning, the method being provided to operate an air conditioning apparatus air conditioning an interior space, the control method including: selecting a mode, wherein either a comfort priority mode and an energy saving mode may be selected as an operational mode; inputting a temperature, wherein an input air conditioning temperature for air conditioning the interior space may be input; setting a temperature, wherein the input air conditioning temperature and a basic air conditioning temperature read out from data stored in a database may be compared to each other, and the basic air conditioning temperature or a revised air conditioning temperature, which may be determined by selecting a higher temperature or a lower temperature among an average temperature of the input air conditioning temperature and the basic air conditioning temperature and a temperature obtained by adding or subtracting a preset revision temperature to or from the basic air conditioning temperature, may be set as an air conditioning operational temperature for air conditioning the interior space; and operating air conditioning, wherein the air conditioning apparatus may be operated so that the interior space may be air conditioned at the air conditioning operational temperature.

In the setting of the temperature, a basic environmental factor about the interior space may be read out from multiple data stored in the database, and the basic air conditioning temperature may be read out from the data including the basic environmental factor that may be an extremely approximate value of a detected environmental factor detected from the interior space.

In the setting of the temperature, when the input air conditioning temperature is the same as the basic air conditioning temperature, the basic air conditioning temperature may be set as the air conditioning operational temperature, and when the input air conditioning temperature is different from the basic air conditioning temperature, the basic air conditioning temperature or the revised air conditioning temperature may be set as the air conditioning operational temperature.

In the setting of the temperature, in the comfort mode, in cooling, when the input air conditioning temperature is less than the basic air conditioning temperature, the revised air conditioning temperature, which may be determined as the lower temperature selected from the average temperature of the input air conditioning temperature and the basic air conditioning temperature and the temperature obtained by subtracting the preset revision temperature from the basic air conditioning temperature, may be set as the air conditioning operational temperature, and when the input air conditioning temperature exceeds the basic air conditioning temperature, the basic air conditioning temperature may be set as the air conditioning operational temperature, and in heating, when the input air conditioning temperature is less than the basic air conditioning temperature, the basic air conditioning temperature may be set as the air conditioning operational temperature, when the input air conditioning temperature exceeds the basic air conditioning temperature, the revised air conditioning temperature, which may be determined as the higher temperature selected from the average temperature of the input air conditioning temperature and the basic air conditioning temperature and the temperature obtained by adding the preset revision temperature to the basic air conditioning temperature, may be set as the air conditioning operational temperature.

In the setting of the temperature, in the energy saving mode, in cooling, when the input air conditioning temperature is less than the basic air conditioning temperature, the revised air conditioning temperature, which may be determined as the higher temperature selected from the average temperature of the input air conditioning temperature and the basic air conditioning temperature and the temperature obtained by subtracting the preset revision temperature from the basic air conditioning temperature, may be set as the air conditioning operational temperature, and when the input air conditioning temperature exceeds the basic air conditioning temperature, the basic air conditioning temperature may be set as the air conditioning operational temperature, and in heating, when the input air conditioning temperature is less than the basic air conditioning temperature, the basic air conditioning temperature may be set as the air conditioning operational temperature, when the input air conditioning temperature exceeds the basic air conditioning temperature, the revised air conditioning temperature, which may be determined as the lower temperature selected from the average temperature of the input air conditioning temperature and the basic air conditioning temperature and the temperature obtained by adding the preset revision temperature to the basic air conditioning temperature, may be set as the air conditioning operational temperature.

In the energy saving mode, only when the number of inputting of the input air conditioning temperature different from the basic air conditioning temperature exceeds the preset inputting number for the preset inputting time in the inputting of the temperature, in the setting of the temperature, the revised air conditioning temperature is set as the air conditioning operational temperature.

The control method may include managing the data, wherein in the energy saving mode, when the revised air conditioning temperature is set as the air conditioning operational temperature, the data in which the basic air conditioning temperature may be revised to the revised air conditioning temperature may be stored in the database or new data in which the revised air conditioning temperature may be set as the basic air conditioning temperature may be stored in the database.

Only when the number of inputting of the input air conditioning temperature different from the basic air conditioning temperature exceeds the preset inputting number for the preset inputting time in the inputting of the temperature at, the managing of the data may be performed.

In the managing of the data, as the detected environmental factor detected from the interior space and the basic environmental factor about the interior space, the basic environmental factor being read out from the data, may be compared to each other, the data in which the basic air conditioning temperature may be revised to the revised air conditioning temperature may be stored in the database or the new data in which the revised air conditioning temperature may be set as the basic air conditioning temperature may be stored in the database.

In the managing of the data, when a deviation between the detected environmental factor and the basic environmental factor is less than a preset reference difference, the data in which the basic air conditioning temperature may be revised to the revised air conditioning temperature may be stored in the database, and when the deviation between the detected environmental factor and the basic environmental factor is equal to or higher than the preset reference difference, new data in which the revised air conditioning temperature may be set as the basic air conditioning temperature and the detected environmental factor is set as the basic environmental factor may be stored in the database.

According to the embodiment of the present disclosure, in the control method for air conditioning, when either the comfort mode and the energy saving mode is selected, the preset basic air conditioning temperature and the input air conditioning temperature are compared to each other in response to the selected mode, and the basic air conditioning temperature or the revision air conditioning temperature obtained by correcting the basic air conditioning temperature is set as the air conditioning operational temperature for the interior space. Particularly, in the embodiment of the present disclosure, in the comfort mode, the air conditioning temperature is revised in order to increase the efficiency of the air conditioning, and in the energy saving mode, the air conditioning temperature is revised in order to save energy. Furthermore, in the embodiment of the present disclosure, in the energy saving mode, the detected environmental factor detected from the interior space to be air-conditioned and the preset basic environmental factor are compared, and thus the basic air conditioning temperature is revised at the revised air conditioning temperature so as to increase the efficiency of air conditioning, or a new basic air conditioning temperature is stored. Therefore, according to the embodiment of the present disclosure, an effect in which air conditioning for the interior space is more efficiently or economically performed can be expected.

DETAILED DESCRIPTION OF THE INVENTION

Hereinbelow, a control method for air conditioning according to an embodiment of the present disclosure will be described in detail with reference to accompanying drawings.

Figure 1:
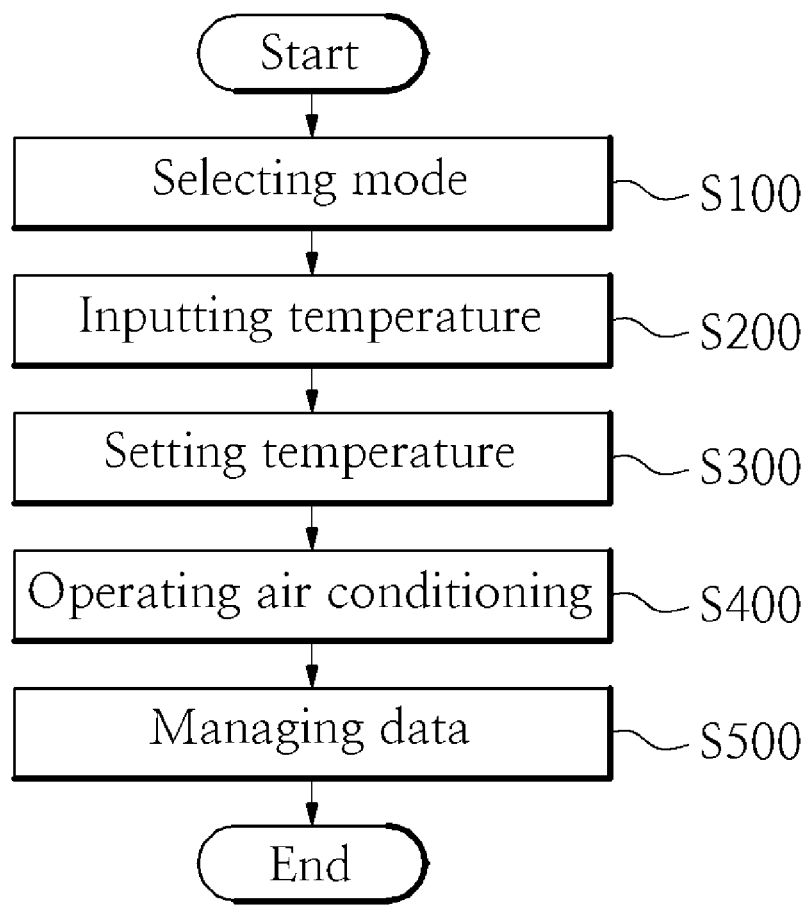
FIG. 1 is a flowchart showing a control method for air conditioning according to an embodiment of the present disclosure.

FIG. 1 is a flowchart showing a control method for air conditioning according to an embodiment of the present disclosure.

Figure 2:
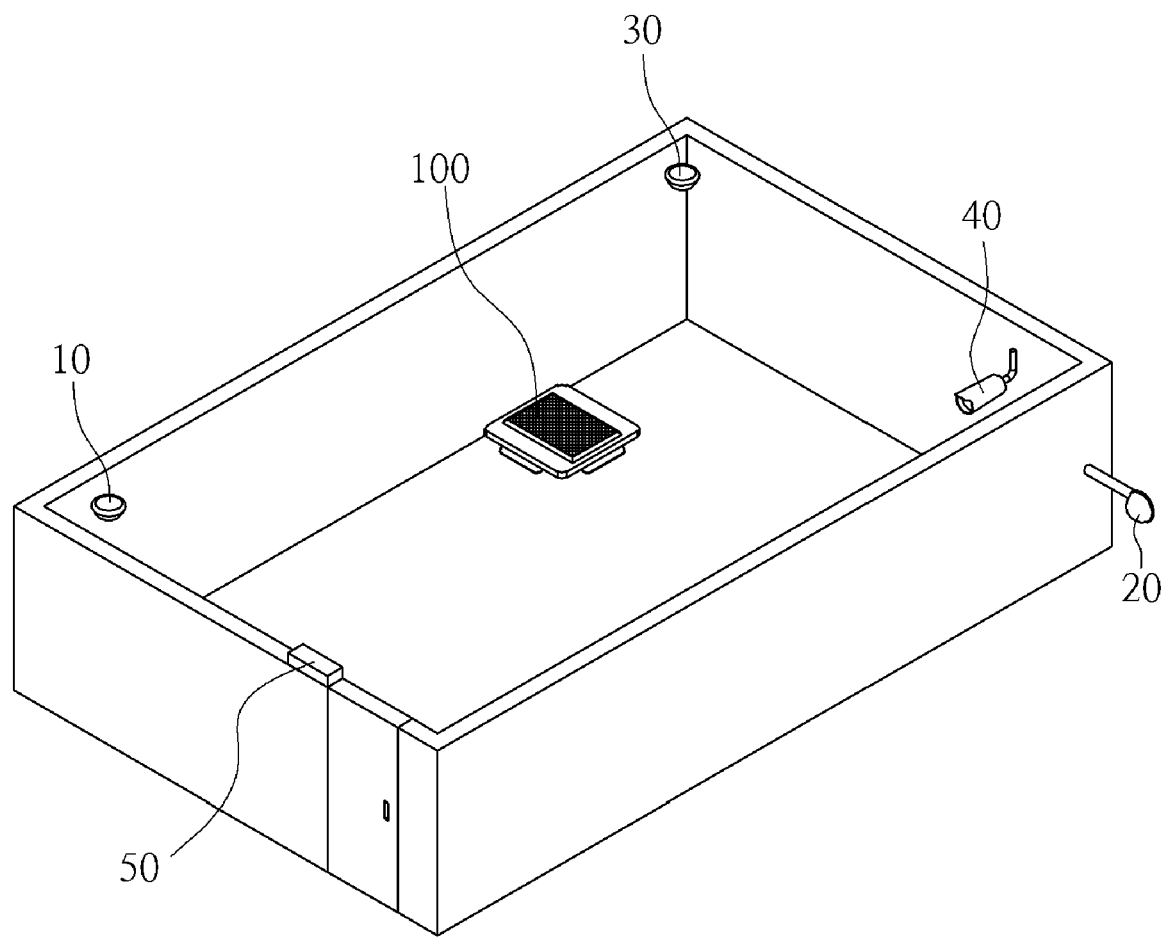
FIG. 2 is a concept view showing schematically a system for implementing the embodiment of the present disclosure.

FIG. 2 is a concept view showing schematically a system for implementing the embodiment of the present disclosure.

Referring to FIGS. 1 and 2, the control method for air conditioning according to the embodiment is provided to operate an air conditioning apparatus 100 for air conditioning if the interior space S, and the control method includes selecting of a mode at S100, inputting of temperature at S200, setting of temperature at S300, operating of air conditioning at S400, and managing of data at S500.

More specifically, in the selecting of a mode at S100, either of a comfort mode AM and an energy saving mode EM is selected as an operational mode. According to selection of the comfort mode AM or the energy saving mode EM in the selecting of a mode at S100, as described later, in the setting of temperature at S300, an air conditioning operational temperature To is set with a relative emphasis on air conditioning efficiency or energy saving.

Next, in the inputting of temperature at S200, an input air conditioning temperature Ti for air conditioning the interior space S is input. The input air conditioning temperature Ti input in the inputting of temperature at S200 is substantially input by an occupant of the interior space S.

In the setting of temperature at S300, the air conditioning operational temperature To for air conditioning the interior space S is set by comparing the input air conditioning temperature Ti to a basic air conditioning temperature Tb. The basic air conditioning temperature Tb is read out from data stored in a database. According to the embodiment, a basic environmental factor Eb about the interior space S is read out from multiple data stored in the database, and the basic air conditioning temperature Tb is read out from the data including the basic environmental factor Eb that is an extremely approximate value of a detected environmental factor Ed detected from the interior space S.

At this point, 'environmental factor' is a factor affecting air conditioning of the interior space S, and for example, external temperature, relative bhumidity, the number of occupants, the number of opening of a door, etc. may be set as the environmental factor. Therefore, in the inside space and outside space of the interior space S, in addition to an interior temperature sensor 10 sensing the temperature of the interior space S, an exterior temperature sensor 20, a humidity sensor 30, an infrared camera 40, door-opening-closing detection sensor 50, etc. may be installed so as to sense the environmental factor as described above.

Furthermore, in the setting of temperature at S300, the basic air conditioning temperature Tb or a revised air conditioning temperature Tr is set as the air conditioning operational temperature To by comparing the input air conditioning temperature Ti and the basic air conditioning temperature Tb. In the setting of temperature at S300, the revised air conditioning temperature Tr is obtained by correcting the basic air conditioning temperature Tb while reflecting the input air conditioning temperature Ti.

More specifically, in the setting of temperature at S300, when the input air conditioning temperature Ti is the same as the basic air conditioning temperature Tb, the basic air conditioning temperature Tb is set as the air conditioning operational temperature To. However, when the input air conditioning temperature Ti is different from the basic air conditioning temperature Tb, in the setting of temperature at S300, the basic air conditioning temperature Tb or the revised air conditioning temperature Tr is set as the air conditioning operational temperature To. Particularly, in the embodiment, depending on whether a mode selected in the selecting of a mode at S100 is the comfort mode AM or the energy saving mode EM, the revised air conditioning temperature Tr is set differently.

More specifically, when the comfort mode AM is selected as the operational mode, in the setting of temperature at S300, in cooling, when the input air conditioning temperature Ti is less than the basic air conditioning temperature Tb, the revised air conditioning temperature Tr determined by selecting a lower temperature among an average temperature of the input air conditioning temperature Ti and the basic air conditioning temperature Tb and a temperature obtained by subtracting a preset revision temperature from the basic air conditioning temperature Tb is set as the air conditioning operational temperature To. In other words, based on the cooling, for example, when the input air conditioning temperature Ti is 22° C., the basic air conditioning temperature Tb is 26° C., and the revision temperature is 1° C., the average temperature of the input air conditioning temperature Ti and the basic air conditioning temperature Tb is 24° C., and the temperature obtained by subtracting the revision temperature from the basic air conditioning temperature Tb is 25° C., so that 24° C. is selected as the revised air conditioning temperature Tr. In addition, in the comfort mode AM, in the setting of temperature at S300, in the cooling, when the input air conditioning temperature Ti exceeds the basic air conditioning temperature Tb, the basic air conditioning temperature Tb is set as the air conditioning operational temperature To.

On the other hand, when the comfort mode AM is selected as the operational mode, in the setting of temperature at S300, in heating, when the input air conditioning temperature Ti is less than the basic air conditioning temperature Tb, the basic air conditioning temperature Tb is set as the air conditioning operational temperature To. Furthermore, in the comfort mode AM, in the setting of temperature at S300, in the heating, when the input air conditioning temperature Ti exceeds the basic air conditioning temperature Tb, a higher temperature among an average temperature of the input air conditioning temperature Ti and the basic air conditioning temperature Tb and a temperature obtained by adding the preset revision temperature to the basic air conditioning temperature Tb is selected as the air conditioning operational temperature To. For example, when the input air conditioning temperature Ti is 30° C., the basic air conditioning temperature Tb is 27° C., and the revision temperature is 1° C., an average temperature of the input air conditioning temperature Ti and the basic air conditioning temperature Tb is 28.5° C., and the temperature obtained by adding the revision temperature to the basic air conditioning temperature Tb is 28° C., so that 28.5 is selected as the revised air conditioning temperature Tr in the heating operation.

As described above, when the comfort mode AM is selected as the operational mode, in the cooling, in order to provide more comfort to the occupant of the interior space S, the air conditioning operational temperature To for the cooling operation is relatively set at a lower temperature. On the other hand, in the heating, when the comfort mode AM is selected as the operational mode, in order to provide more comfort to the occupant of the interior space S, the air conditioning operational temperature To for the heating operation is relatively set at a higher temperature.

Furthermore, in the embodiment, in selecting the energy saving mode EM and cooling, in the setting of temperature at S300, when the input air conditioning temperature Ti is less than the basic air conditioning temperature Tb, the revised air conditioning temperature Tr determined by selecting a higher temperature among an average temperature of the input air conditioning temperature Ti and the basic air conditioning temperature Tb and a temperature obtained by subtracting the preset revision temperature from the basic air conditioning temperature Tb is set as the air conditioning operational temperature To. Therefore, in the cooling, even when a condition of the energy saving mode EM is the same as the condition where 24° C. is selected in the comfort mode AM, in the energy saving mode EM, 25° C. is selected as the revised air conditioning temperature Tr. Furthermore, in selecting the energy saving mode EM and cooling, when the input air conditioning temperature Ti exceeds the basic air conditioning temperature Tb, the revised air conditioning temperature Tr determined by selecting a lower temperature among an average temperature of the input air conditioning temperature Ti and the basic air conditioning temperature Tb and a temperature obtained by adding the preset revision temperature to the basic air conditioning temperature Tb is set as the air conditioning operational temperature To. Therefore, in the heating, in the energy saving mode EM, when a condition thereof is the same as the condition of the comfort mode AM in which 28.5° C. is selected as the revised air conditioning temperature Tr, 28° C. is selected as the revised air conditioning temperature Tr. In other words, when the energy saving mode EM is selected, the revised air conditioning temperature Tr is determined at a temperature relatively capable of performing energy saving.

Meanwhile, in selecting the energy saving mode EM and cooling, in the setting of temperature at S300, the input air conditioning temperature Ti exceeds the basic air conditioning temperature Tb, the basic air conditioning temperature Tb is set as the air conditioning operational temperature To. Furthermore, in selecting the energy saving mode EM and heating, in the setting of temperature at S300, when the input air conditioning temperature Ti is less than the basic air conditioning temperature Tb, the basic air conditioning temperature Tb is set as the air conditioning operational temperature To. In other words, even in the energy saving mode EM, the air conditioning operational temperature To is set such that at least cooling or heating at the input air conditioning temperature Ti is performed.

Furthermore, in the embodiment, when the energy saving mode EM is selected, only when the number of inputting of the input air conditioning temperature Ti different from the basic air conditioning temperature Tb exceeds the preset inputting number for the preset inputting time in the inputting of temperature at S200, the revised air conditioning temperature Tr is set as the air conditioning operational temperature To in the setting of temperature at S300. In other words, since the energy saving mode EM is selected by the occupant, in a state in which the energy saving mode EM is selected, only when the input air conditioning temperature Ti different from the basic air conditioning temperature Tb is input multiple times for a predetermined time, it is determined that the occupant intends air conditioning that prioritizes comfort over energy saving. For example, only when the input air conditioning temperature Ti different from the basic air conditioning temperature Tb is input more than 2 times for 1 hour, the revised air conditioning temperature Tr may be set as the air conditioning operational temperature To in the setting of temperature at S300.

Next, in the operating of air conditioning at S400, the air conditioning apparatus 100 is operated so that the interior space S is air conditioned at the air conditioning operational temperature To. In the operating of air conditioning at S400, a well-known cooling, heating, or cooling and heating apparatus may be used as the air conditioning apparatus 100 for air conditioning the interior space S.

Last, in the managing of data at S500, when the revised air conditioning temperature Tr is set as the air conditioning operational temperature To while the energy saving mode EM is selected, modification or generation of data is performed. In other words, in the managing of data at S500, the data in which the basic air conditioning temperature Tb is revised to the revised air conditioning temperature Tr is stored in the database or new data in which the revised air conditioning temperature Tr is set as the basic air conditioning temperature Tb is stored in the database.

In the embodiment, the managing of data at S500 as described above is performed only when, in the inputting of temperature at S200, the number of inputting of the input air conditioning temperature Ti different from the basic air conditioning temperature Tb exceeds the preset inputting number for the preset inputting time. In other words, when the input air conditioning temperature Ti different from the basic air conditioning temperature Tb is input, since it may be assumed that the occupant does not feel comfort when the interior space S is air conditioned at the basic air conditioning temperature Tb, modification or generation of the data may be required. However, when the input air conditioning temperature Ti is a one-time request of the occupant, the data, i.e., the basic air conditioning temperature Tb, does not need to be modified or generated. Therefore, in the embodiment, only when the input air conditioning temperature Ti is input multiple times for the predetermined time, the managing of data at S500 is performed.

Furthermore, in the embodiment, in the managing of data at S500, the data is modified or new data is generated by comparing the detected environmental factor Ed and the basic environmental factor Eb. In other words, in the managing of data at S500, when a deviation between the detected environmental factor Ed and the basic environmental factor Eb is less than a preset reference difference, the data in which the basic air conditioning temperature Tb is revised to the revised air conditioning temperature Tr is stored in the database. In the managing of data at S500, when the deviation between the detected environmental factor Ed and the basic environmental factor Eb is equal to or higher than the preset reference difference, new data in which the revised air conditioning temperature Tr is set as the basic air conditioning temperature Tb and the detected environmental factor Ed is set as the basic environmental factor Eb is stored in the database. In other words, when the deviation between the detected environmental factor Ed and the basic environmental factor Eb is relatively small, a request for comfort of the occupant is different in an environment similar to the existing environment, so that the existing data is revised. On the other hand, air conditioning for comfort in a new environment is actually performed, so that new data for the new environment is generated and is used to next air conditioning.

Within the scope and spirit of the present disclosure as described above, those skilled in the art will appreciate that various modifications, additions and substitutions are possible, and the scope of the present disclosure should be interpreted based on the accompanying claims.

What is claimed is:

1. A control method for air conditioning, the method being provided to operate an air conditioning apparatus (100) air conditioning an interior space (S), the control method comprising:
   selecting a mode, wherein either a comfort priority mode (AM) or an energy saving mode (EM) is selected as an operational mode;
   inputting a temperature, wherein an input air conditioning temperature (Ti) for air conditioning the interior space (S) is input;
   setting a temperature, wherein the input air conditioning temperature (Ti) and a basic air conditioning temperature (Tb) read out from data stored in a database are compared to each other, and the basic air conditioning temperature (Tb) or a revised air conditioning temperature (Tr), which is determined by selecting a higher temperature or a lower temperature among an average temperature of the input air conditioning temperature (Ti) and the basic air conditioning temperature (Tb) and a temperature obtained by adding or subtracting a preset revision temperature to or from the basic air conditioning temperature (Tb), is set as an air conditioning operational temperature (To) for air conditioning the interior space (S),
   wherein the basic air conditioning temperature is a temperature value that is pre-stored in the database as a default temperature value; and operating air conditioning, wherein the air conditioning apparatus (100) is operated so that the interior space (S) is air conditioned at the air conditioning operational temperature (To), wherein in the setting of the temperature, when the input air conditioning temperature (Ti) is the same as the basic air conditioning temperature (Tb), the basic air conditioning temperature (Tb) is set as the air conditioning operational temperature (To), and when the input air conditioning temperature (Ti) is different from the basic air conditioning temperature (Tb), the basic air conditioning temperature (Tb) or the revised air conditioning temperature (Tr) is set as the air conditioning operational temperature (To), wherein in the setting of the temperature, in the comfort mode (AM), in cooling, when the input air conditioning temperature (Ti) is less than the basic air conditioning temperature (Tb), the revised air conditioning temperature (Tr), which is determined as the lower temperature selected from the average temperature of the input air conditioning temperature (Ti) and the basic air conditioning temperature (Tb) and the temperature obtained by subtracting the preset revision temperature from the basic air conditioning temperature (Tb), is set as the air conditioning operational temperature (To), and when the input air conditioning temperature (Ti) exceeds the basic air conditioning temperature (Tb), the basic air conditioning temperature (Tb) is set as the air conditioning operational temperature (To), and in heating, when the input air conditioning temperature (Ti) is less than the basic air conditioning temperature (Tb), the basic air conditioning temperature (Tb) is set as the air conditioning operational temperature (To), when the input air conditioning temperature (Ti) exceeds the basic air conditioning temperature (Tb), the revised air conditioning temperature (Tr), which is determined as the higher temperature selected from the average temperature of the input air conditioning temperature (Ti) and the basic air conditioning temperature (Tb) and the temperature obtained by adding the preset revision temperature to the basic air conditioning temperature (Tb), is set as the air conditioning operational temperature (To), and wherein in the setting of the temperature, in the energy saving mode (EM), in cooling, when the input air conditioning temperature (Ti) is less than the basic air conditioning temperature (Tb), the revised air conditioning temperature (Tr), which is determined as the higher temperature selected from the average temperature of the input air conditioning temperature (Ti) and the basic air conditioning temperature (Tb) and the temperature obtained by subtracting the preset revision temperature from the basic air conditioning temperature (Tb), is set as the air conditioning operational temperature (To), and when the input air conditioning temperature (Ti) exceeds the basic air conditioning temperature (Tb), the basic air conditioning temperature (Tb) is set as the air conditioning operational temperature (To), and in heating, when the input air conditioning temperature (Ti) is less than the basic air conditioning temperature (Tb), the basic air conditioning temperature (Tb) is set as the air conditioning operational temperature (To), when the input air conditioning temperature (Ti) exceeds the basic air conditioning temperature (Tb), the revised air conditioning temperature (Tr), which is determined as the lower temperature selected from the average temperature of the input air conditioning temperature (Ti) and the basic air conditioning temperature (Tb) and the temperature obtained by adding the preset revision temperature to the basic air conditioning temperature (Tb), is set as the air conditioning operational temperature (To).

2. The control method of claim 1, wherein in the setting of the temperature, a basic environmental factor (Eb) about the interior space (S) is read out from multiple data stored in the database, and the basic air conditioning temperature (Tb) is read out from the data including the basic environmental factor (Eb) that is the closest value, among basic environmental factors stored in the database, to a detected environmental factor (Ed) detected from the interior space (S).

3. The control method of claim 1, wherein in the energy saving mode (EM), only when a number of inputting of the input air conditioning temperature (Ti) different from the basic air conditioning temperature (Tb) exceeds a preset inputting number for a preset inputting time in the inputting of the temperature, in the setting of the temperature, the revised air conditioning temperature (Tr) is set as the air conditioning operational temperature (To).

4. The control method of claim 1, further comprising:
managing the data, wherein in the energy saving mode (EM), when the revised air conditioning temperature (Tr) is set as the air conditioning operational temperature (To), the data in which the basic air conditioning temperature (Tb) is revised to the revised air conditioning temperature (Tr) is stored in the database or new data in which the revised air conditioning temperature (Tr) is set as the basic air conditioning temperature (Tb) is stored in the database.

5. The control method of claim 4, wherein only when a number of inputting of the input air conditioning temperature (Ti) different from the basic air conditioning temperature (Tb) exceeds a preset inputting number for a preset inputting time in the inputting of the temperature, the managing of the data is performed.

6. The control method of claim 5, wherein in the managing of the data, as a detected environmental factor (Ed) detected from the interior space (S) and a basic environmental factor (Eb) about the interior space (S), the basic environmental factor (Eb) being read out from the data, are compared to each other, the data in which the basic air conditioning temperature (Tb) is revised to the revised air conditioning temperature (Tr) is stored in the database or the new data in which the revised air conditioning temperature (Tr) is set as the basic air conditioning temperature (Tb) is stored in the database.

7. The control method of claim 6, wherein in the managing of the data,
when a deviation between the detected environmental factor (Ed) and the basic environmental factor (Eb) is less than a preset reference difference, the data in which the basic air conditioning temperature (Tb) is revised to the revised air conditioning temperature (Tr) is stored in the database, and
when the deviation between the detected environmental factor (Ed) and the basic environmental factor (Eb) is equal to or higher than a preset reference difference, new data in which the revised air conditioning temperature (Tr) is set as the basic air conditioning temperature (Tb) and the detected environmental factor (Ed) is set as the basic environmental factor (Eb) is stored in the database.

* * * * *